United States Patent [19]

Brammer

[11] 4,070,041

[45] Jan. 24, 1978

[54] VEHICLE STABILIZER

[76] Inventor: Robert C. Brammer, Suttens Bay P.O., Suttens Bay, Mich. 49582

[21] Appl. No.: 740,397

[22] Filed: Nov. 10, 1976

[51] Int. Cl.² .............................................. B60S 9/02
[52] U.S. Cl. .................................... 280/763; 280/765
[58] Field of Search ................ 280/763, 764, 765, 766

[56] References Cited

U.S. PATENT DOCUMENTS 3,801,128   4/1974   Herndon .............................. 280/763
3,841,663   10/1974  Proffit ................................... 280/766

Primary Examiner—Robert R. Song
Attorney, Agent, or Firm—Price, Heneveld, Huizenga & Cooper

[57] ABSTRACT

A pair of jack assemblies, each having a longitudinally adjustable body and support foot diagonally coupled to the bottom of the body, are rotationally coupled to a pair of plates mounted to a vehicle. In an operational position, the jack assemblies extend downward to the ground in an outward direction transverse to the longitudinal axis of the vehicle. In a storage position, the jack assemblies are rotated upward to a horizontal position so they extend beyond the sides of the vehicle and then adjusted to decrease their length so the foot engages a portion of the vehicle and prevents downward rotational movement of the jack assembly. The coupling between each jack assembly and the associated mounting plate provides for limiting rotation of the jack assembly between the operational and storage positions.

12 Claims, 7 Drawing Figures

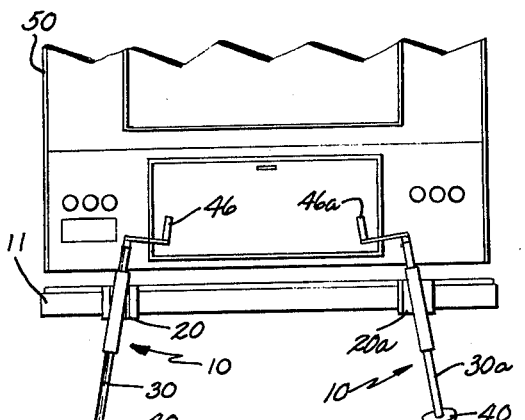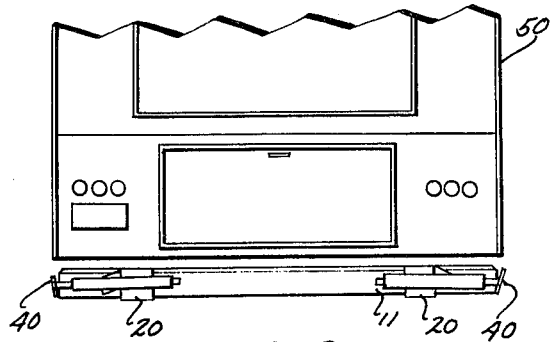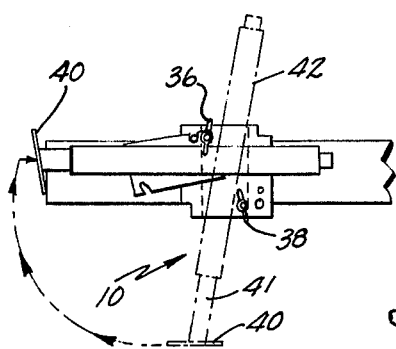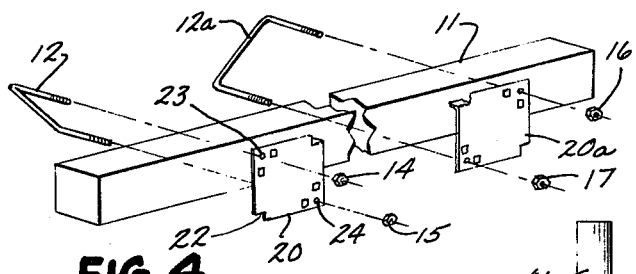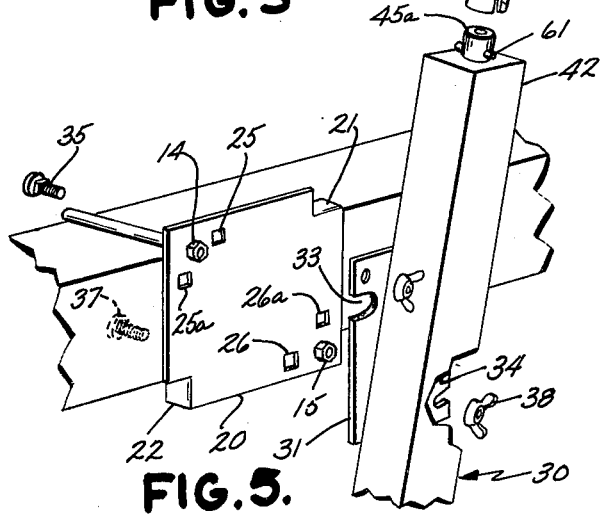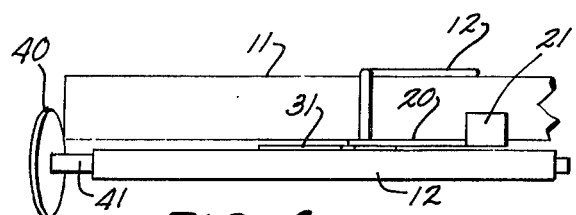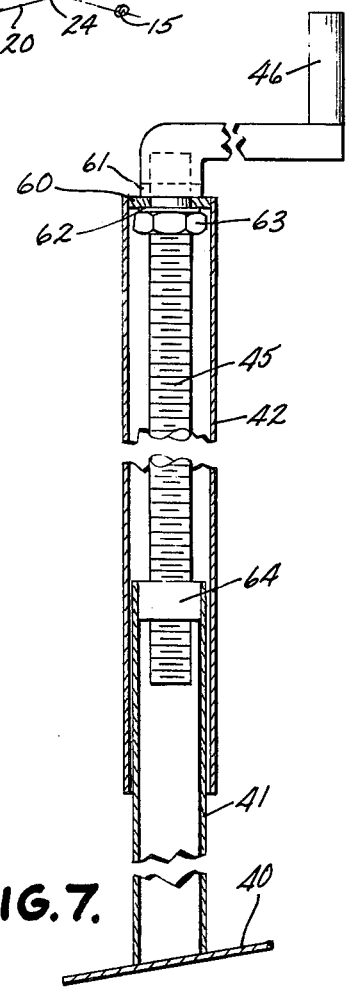

VEHICLE STABILIZER

BACKGROUND OF THE INVENTION

This invention relates to a stabilizer for parked motor homes, travel trailers, and the like, and, more particularly, to self-storing stabilizers for such vehicles.

When a vehicle such as a travel trailer or motor home has reached its destination it is typically desirable to provide a stabilizer for the parked vehicle to counteract the effects of uneven ground or the tendency to rock or sway as the vehicle is used by occupants or subjected to strong winds. One common practice in the past has been to place blocks or the like between the ground and the side of the body at spaced positions around the vehicle. As an alternative, adjustable length devices have been used to provide support between the vehicle and the ground.

These prior devices have often been difficult to install on the vehicle and then difficult to operate after installation. In particular, putting the stabilizer in a storage position, for use during vehicle transit, from an operational position, for use during vehicle parking, has presented problems. Typically, securing the stabilizer in the storage position has required the installation of additional support means on the vehicle or on the stabilizer. For example, the prior art teaches installing flanges on the vehicles which are then coupled by a pin to the stabilizer when the stabilizer is put in the storage position. Alternatively, various force supplying means such as springs or tie bars have been used in conjunction with stabilizers to secure the stabilizer in a storage position. The prior art also teaches completely disconnecting the stabilizer from the vehicle in order to position the stabilizer in a storage position.

SUMMARY OF THE INVENTION

This invention teaches a stabilizer which is simple, readily installed and cooperates with an existing portion of the vehicle to provide a storage position for the stabilizer.

A self-storing vehicle stabilizer has a jack assembly rotationally mounted to the vehicle by a mounting plate. The jack assembly includes an elongated body of adjustable length attached to a foot for resting on the ground. The jack assembly is mounted to the vehicle so rotational movement is limited between an operational position where the foot engages the ground to stabilize the vehicle and a storage position where the foot is secured to the vehicle. Rotation from the storage position to the operational position can be prevented by sufficiently shortening the body of the jack assembly so the foot engages the vehicle and thus interferes with downward rotational movement of the jack assembly. Such cooperation between the stabilizer and the vehicle simplifies both the structure and the operation of the stabilizer. Such simplicity reduces fabrication costs and increases reliability.

BRIEF DESCRIPTION OF THE DRAWINGS

FIG. 1 is a rear elevation view of a vehicle with stabilizers in an operational position in accordance with the embodiment of this invention;

FIG. 2 is a rear elevational view of a vehicle with stabilizers in a storage position in accordance with an embodiment of this invention.

FIG. 3 is a rear elevational view of a stabilizer in a storage position and an operational position shown in phantom in accordance with the embodiment of this invention;

FIG. 4 is an exploded rear perspective view of a partially mounted stabilizer in accordance with the embodiment of this invention;

FIG. 5 is a rear perspective view of a partially mounted stabilizer in accordance with the embodiment of this invention;

FIG. 6 is a top plan view of a stabilizer in a storage position in accordance with the embodiment of this invention; and FIG. 7 is a cross section of a jack assembly of a stabilizer in accordance with the embodiment of this invention.

DETAILED DESCRIPTION OF THE INVENTION

Referring to FIG. 1, a vehicle 50 has a bumper 11 upon which is mounted a vehicle stabilizer 10 in an operational position. Vehicle stabilizer 10 includes a pair of mounting plates 20 and 20a connected to bumper 11 and a pair of jack assemblies 30 and 30a rotationally coupled to mounting plates 20 and 20a, respectively. In the operational position, jack assemblies 30 and 30a extend downward to the ground in an outward direction transverse to the longitudinal axis of vehicle 50.

Referring to FIG. 2, vehicle stabilizer 10 is shown in a storage position wherein jack assemblies 30 and 30a are rotated to a horizontal position and engage the side extremities of bumper 11 thereby preventing downward rotation. That is, the extremities of bumper 11 are in the path of downward rotation of a portion of jack assemblies 30 and 30a. Advantageously, mounting plate 20 and jack assembly 30 are mirror images, mounted at opposite ends of bumper 11, of mounting plate 20a and jack assembly 30a. For simplicity, only one unit will be described in detail.

Referring to FIG. 4, mounting plate 20 is a substantially planar, rectangular structural component with a horizontal tab 21 formed by bending the upper right corner toward the vehicle along a horizontal crease and a vertical tab 22 formed by bending the lower left corner toward the vehicle along a vertical crease. Tabs 21 and 22 are positioned adjacent bumper 11 and help support vehicle stabilizer 10 relative to bumper 11. Mounting plates 20 and 20a are coupled to bumper 11 by U-bolts 12 and 12a respectively. U-bolt 12 engages bumper 11 within the U and has extremities which extend through an opening 23 in the upper left corner of mounting plate 20 and an opening 24 in the lower right corner of mounting plate 20 thereby mounting U-bolt 12 diagonally with respect to mounting plate 20. A nut 14 engages the extremity of U-bolt 12 passing through opening 23 and a nut 15 engages the extremity of U-bolt 12 passing through opening 24. Mounting plate 20 also has an opening 25 in the upper left corner and an opening 26 in the lower right corner for mounting and securing jack assembly 30. Advantageously, for ease of manufacture, mounting plate 20 also contains openings 25a and 26a which would be used when mounting jack assembly 30a on mounting plate 20a, thus rendering a single plate suitable for either a right or left hand installation.

Referring to FIG. 5, jack assembly 30 includes a jack upper tube 42 coupled diagonally across a face of a pivot plate 31. Pivot plate 31 is a substantially rectangular, planar metal piece and upper tube 42 is an elongated tube having a generally square cross section with one side attached to pivot plate 31 by such means as welding. Pivot plate 31 includes a pivot opening 32 in the upper left corner for aligning with opening 25 and being coupled to mounting plate 20 by a pivot bolt 35 passing through openings 25 and 32 and secured by a wing nut 36. Pivot plate 31 also includes a securing indentation 34 in the lower right corner with side walls following an arc having opening 32 at its center. Indentation 34 engages a bolt 37 passing through opening 26 and secured by a wing nut 38 thereby securing pivot plate 31 in an operational position. Pivot plate 31 further includes a stop indentation 33 indented into the opposite edge of pivot plate 31 from indentation 34, i.e. in the upper left corner, and aligned to engage nut 14 when upper tube 42 is in a generally horizontal storage position. As a result, pivot plate 31 is free to rotate between a storage position where stop indentation 33 engages nut 14 and an operational position where securing indentation 34 engages securing bolt 37.

Jack assembly 30 further includes a jack lower tube 41 positioned within and telescopically movable with respect to jack upper tube 42 (FIG. 3 and FIG. 4). Jack lower tube 41 also has a generally square cross section and is typically hollow and formed of a structural material. As shown in FIG. 7, tubes 41 and 42 are internally coupled by a jack screw 45 which is turned by a handle 46. Upper tube 42 is closed at its upper extremity by a rectangular plate 60 having an aperture therethrough. Plate 60 is secured to tube 42 by welding or other suitable means. Jackscrew 45 is rotatably stabilized with respect to upper tube 42 by means of a roll pin 61, thrust washer 62 and non-rotatable nut 63 which sandwich and vertically stabilize jackscrew 45 within the aperture in plate 60. Tube 41 has a conventional thrust nut 64 welded within its upper extremity. Jackscrew 45 is threadably received within nut 64. Handle 46 (see FIG. 5) has a central, longitudinal opening at its base to receive upper extremity 45a of jackscrew 45 and two longitudinal, opposing slots 65 and 65a at its base to receive the ends of roll pin 61 extending beyond upper extremity 45a. As a result, handle 46 engages roll pin 61 so turning handle 46 raises or lowers the extension of jack lower tube 41 from within jack upper tube 42.

A foot or pad 40 is attached to the lower extremity of jack lower tube 41 and extends laterally beyond the walls of jack lower tube 41. Typically, foot 40 is a planar material of a generally circular shape and is welded to lower tube 41. To prevent lateral motion of vehicle 50, jack upper tube 42 is advantageously mounted to pivot plate 31 so tubes 41 and 42 extend downward to the ground in an outward direction transverse to the longitudinal axis of vehicle 50. Accordingly, foot 40 is mounted so the major surface of foot 40 is substantially horizontal and is offset from the perpendicular to the longitudinal axis of jack assembly 30. The combination of jack lower tube 41 and foot 40 is reversible and can be used on either the left or the right side of vehicle 50. Foot 40 has a sufficiently large diameter so when jack assembly 30 is in the storage position aligned with bumper 11 and jack lower tube 41 is retracted within jack upper tube 42, foot 40 engages the end of bumper 11 (FIG. 6).

In the storage position, the arc of travel of downward rotational movement of foot 40 cuts through bumper 11 (FIG. 3). Thus, jack assembly 30 is secured in the storage position through cooperation of vehicle 50 with jack assembly 30. To return jack assembly 30 to the operational position from the storage position, lower tube 41 is extended from upper tube 42 so foot 40 moves horizontally away from the end of bumper 11. Foot 40 is moved sufficiently so the arc of travel of downward rotational movement of foot 40 clears all portions of bumper 11. Jack assembly 30 is swung downward until securing indentation 34 engages pivot bolt 37. Tightening securing wing nut 38 on bolt 37 secures pivot plate 31 in the operational position. Jack lower tube 41 is then extended until foot 40 engages the ground.

It is particularly advantageous that positioning jack assembly 30 in either the operating position or the storage position is done by positive engagement of stops and does not require any visual adjustment. That is, there are no bolts to pass through holes which must be aligned with other holes. Basically, to put jack assembly 30 in either the operational or storage position requires rotation until a stop is reached and then securing jack assembly 30 in the position. Securing in the storage position is done by shortening jack assembly 30 by turning handle 46 and securing in the operational position is done by tightening wing nut 38. Analogously, to remove jack assembly 30 from either the operational or storage position requires loosening the securing means and then rotation away from the stop.

Further, in both the storage and the operational positions there are two forces acting to keep jack assembly 30 at the desired position. In the storage position, upward rotation is prevented by the engagement of indentation 33 with nut 14. Downward rotation in the storage position is prevented by foot 40 engaging bumper 11. In the operational position, further rotation in the direction away from the storage position is prevented by indentation 34. Rotation of jack assembly 30 in the direction towards the storage position is prevented by wing nut 38, the engagement of foot 40 by the ground and the counteracting force of the adjacent assembly.

Various modifications and variations will no doubt occur to those skilled in the arts to which this invention pertains. For example, the particular shape of the foot and of the jack assembly may be varied from that disclosed herein. These and all other variations which rely on the teachings through which this disclosure has advanced the art are properly considered within the scope of this invention as defined by the appended claims.

The embodiments of the invention in which an exclusive property or privilege is claimed are defined as follows:

1. A self-storing vehicle stabilizer adapted for attachment to an elongated, horizontal structural member of a vehicle such as a bumper, comprising:

a jack assembly having an elongated body of adjustable length;

a ground engaging foot attached to the extremity of said jack assembly;

means for rotatably mounting said assembly on the structural member such that said assembly is swingable about an axis extending above the lowermost surface of the structural member on which it is adapted to be mounted, said assembly being swingable between a storage position in which it is generally parallel to the longitudinal axis of the structural member and an operational position in which said foot is adapted to contact the ground;

said jack assembly being adjustable to a length so that said foot is aligned with the end of the structural member in the storage position, the adjustability being sufficient so that at a first length said foot clears the end of the structural member and at a second length, shorter than said first length, said foot engages the structural member; and said foot being sized to extend from said jack assembly beyond an edge of the structural member so as to engage the end of the structural member when said assembly is rotated to its storage position and then shortened thereby stabilizing said assembly in said storage position.

2. An apparatus as recited in claim 1 wherein said jack assembly includes:

a generally planar pivot plate attached to said jack body for coupling said jack body to said mounting means; said pivot plate having a pivot opening for pivotally coupling said pivot plate to said mounting means, a stop means radially displaced in the plane of the pivot plate from said pivot opening for limiting upward rotation of said pivot plate by engaging said mounting means, and a securing means radially displaced in the plane of the pivot plate from said pivot opening for securing said pivot plate to said mounting means when said jack assembly is in the operational position.

3. An apparatus as recited in claim 2 wherein said mounting means includes a mounting plate secured to the vehicle by a bolt means so said mounting plate has a major surface parallel to said pivot plate, said mounting plate having an angled tab for engaging the vehicle structural member and preventing relative motion between the mounting plate and the vehicle structural member, a mounting stop means for cooperating with said stop means for cooperating with said stop means of said pivot plate to limit upward rotational movement of said jack assembly, a mounting securing means for cooperating with said securing means of said pivot plate to secure said jack assembly in an operational position, and a mounting pivot means for cooperating with said pivot opening of said pivot plate to provide for pivotal rotation of said jack assembly with respect to mounting means.

4. An apparatus as recited in claim 3 wherein said foot includes a generally planar surface for resting on the vehicle support surface, said planar surface being displaced from the direction perpendicular to the longitudinal axis of said jack body so when said planar surface is horizontally positioned the longitudinal axis of said jack body is displaced from the vertical and is in the operational position.

5. A self storing vehicle stabilizer comprising:

a pair of jack assemblies, each jack assembly having an elongated body of adjustable length and foot means coupled to an extremity of said body and extending laterally outward from said body sufficiently to engage the bumper of the stabilized vehicle when said body is in a storage position, the adjustability being sufficient so that at a first length said foot clears the end of the bumper and at a second length, shorter than said first length, said foot engages the bumper; and a pair of spaced mounting means, each mounting means rotationally coupling one of said jack assemblies to a vehicle about an axis extending above the lowermost surface of the bumper on which it is mounted, securing said jack assembly in an operational position wherein elongating said jack body results in said foot means engaging a vehicle support surface such as ground, and limiting upward rotational movement of said jack assembly at the storage position wherein sufficiently shortening said jack body results in said foot means engaging the end of the bumper and preventing downward rotational movement of said foot means.

6. An apparatus as recited in claim 5 wherein said foot means includes a generally planar surface for resting on the vehicle support surface and angled from the direction perpendicular to the longitudinal axis of said jack body so when said planar surface is horizontally disposed said jack bodies are diverging.

7. An apparatus as recited in claim 6 wherein said pair of jack assemblies includes a pair of mirror-image pivot plates, each one attached to one of said jack bodies for coupling said jack bodies to said mounting means, each of said pivot plates having a pivot opening for pivotally coupling said pivot plate to said mounting means, a stop means radially displaced in the plane of the pivot plate from said pivot opening for limiting upward rotation of said pivot plate by engaging said mounting means, and a securing means radially displaced in the plane of the pivot plate from said pivot opening for securing said pivot plate to said mounting means when said jack assembly is in the operational position.

8. An apparatus as recited in claim 7 wherein said mounting means includes a mounting plate secured to the vehicle by a bolt means so said mounting plate has a major surface parallel to said pivot plate, said mounting plate having an angled tab for engaging the vehicle and preventing relative motion between the mounting plate and the vehicle, a mounting stop means for cooperating with said stop means of said pivot plate to limit upward rotational movement of said jack assembly, a mounting securing means for cooperating with said securing means of said pivot plate to secure said jack assembly in an operational position, and a mounting pivot means for cooperating with said pivot opening of said pivot plate to provide for pivotal rotation of said jack assembly with respect to said mounting means.

9. A movable vehicle stabilizer comprising:

a pair elongated supporting struts of adjustable length each having a first extremity rotationally coupled to a vehicle and a second extremity adapted to engage the vehicle and to engage the ground;

a foot means coupled to the second extremity of each of said struts, said foot means including a surface extending transversely outward from said struts sufficiently to engage a portion of the vehicle when said struts are in a generally horizontal attitude and sufficiently shortened;

a pair of mounting plates secured to the bumper of the vehicle so said mounting plate has a major vertical surface, said mounting plate having integral tab extensions protruding toward the vehicle to prevent relative motion between said mounting plate and the bumper; said mounting plates rotationally coupling said struts to the vehicle, securing said struts in an operational position wherein elongating said struts results in said foot means engaging the ground, and limiting upward rotational movement of said struts at a storage position wherein sufficiently shortening said struts results in said foot means engaging an extremity of the bumper and preventing downward rotational movement of said foot means;

a pair of generally planar pivot plates, each plate attached to a strut and substantially parallel to said mounting plate for interfacing between said strut and said mounting plate; said pivot plate having a pivot opening for pivotally coupling said pivot plate to said mounting plate, a stop means radially displaced in the plane of the pivot plate from said pivot opening for limiting upward rotation of said pivot plate by engaging said mounting plate, and a securing means radially displaced in the plane of the pivot plate from said pivot opening a distance greater than the displacement of said stop means from said pivot opening for securing said pivot plate to said mounting plate when said strut is in the operational position; and said mounting plate having a mounting stop means for cooperating with said stop means of said pivot plate to limit upward rotational movement of said strut, a mounting securing means for cooperating with said securing means of said pivot plate to secure said strut in an operational position, and a mounting pivot means for cooperating with said pivot opening of said pivot plate to provide for pivotal rotation of said strut with respect to said mounting plate.

10. A movable vehicle stabilizer as recited in claim 9 wherein:

said mounting stop means includes a nut and bolt combination coupling said mounting plate to the bumper of the vehicle;

said mounting securing means includes a nut and bolt combination coupling said mounting plate to the bumper of the vehicle;

said mounting pivot means includes a pivot opening through said mounting plate and a nut and bolt combination passing through said pivot opening;

said stop means of said pivot plate includes an indentation into a first edge of said pivot plate; and said securing means of said pivot plate includes an indentation into a second edge of said pivot plate, said second edge being opposite from said first edge.

11. A self-storing vehicle stabilizer adapted for attachment to an elongated, horizontal structural member of a vehicle, such as a bumper, comprising:

a jack assembly having an elongated body of adjustable length;

a ground engaging foot attached to the extremity of said jack assembly, said foot being fixed with respect to said jack assembly so that it maintains the same relative rotational orientation with respect to said jack assembly;

means for rotatably mounting said assembly on the structural member such that said assembly is swingable from a storage position in which it is generally parallel to the longitudinal axis of the structural member and an operational position in which said foot is adapted to contact the ground;

said jack assemby being adjustable to a length so said foot is aligned with the end of the structural member in the storage position, the adjustability being sufficient so that at a first length said foot clears the end of the structural member and at a second length, shorter than said first length, said foot engages the structural member; and said foot being sized so as to engage the end of the structural member when said assembly is rotated to its storage position and shortened thereby stabilizing said assembly in said storage position.

12. A self-storing vehicle stabilizer adapted for attachment to a vehicle comprising:

a vehicle structural member, such as a bumper, said structural member being a part of the vehicle and adapted for coupling to said vehicle stabilizer;

a jack assembly having an elongated body of adjustable length;

a ground engaging foot attached to the extremity of said jack assembly said foot being fixed with respect to said jack assembly so that it maintains the same relative rotational orientation with respect to said jack assembly;

means for rotatably mounting said assembly on said structural member such that said assembly is swingable from a storage position in which it generally coextends in the same direction as a portion of said structural member and an operational position in which said foot is adapted to contact the ground;

said jack assembly being adjustable to a length so said foot is aligned with the end of said structural member in the storage position, the adjustability being sufficient so that at a first length said foot clears the end of said structural member and at a second length, shorter than said first length, said foot engages said structural member; and said foot being sized so as to engage the end of said structural member when said assembly is rotated to its storage position and shortened thereby stabilizing said assembly in said storage position.

* * * * *